T. M. SMITH.
EDUCATIONAL APPLIANCE.
APPLICATION FILED APR. 9, 1920.
1,343,095.
Patented June 8, 1920.
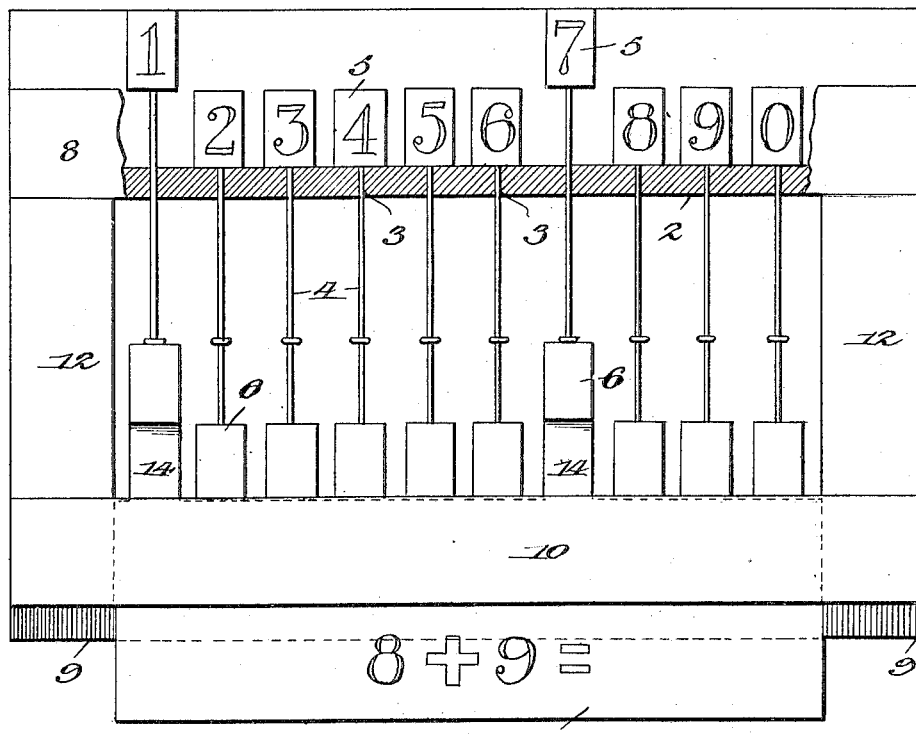
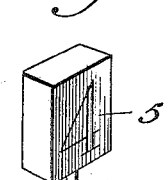
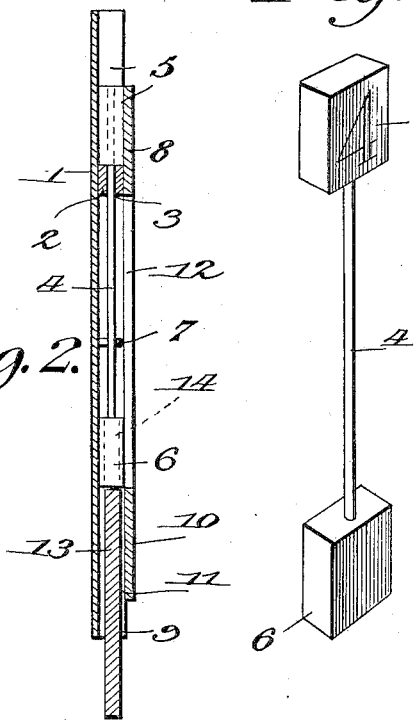
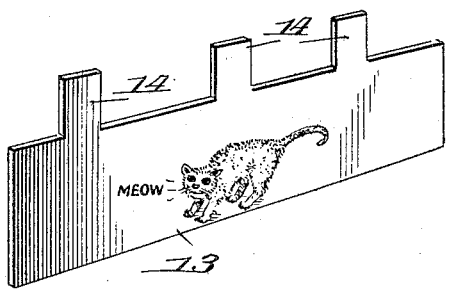
Theodore M. Smith, INVENTOR
BY Victor J. Evans, ATTORNEY

UNITED STATES PATENT OFFICE.

THEODORE M. SMITH, OF NEW YORK, N. Y., ASSIGNOR OF ONE-HALF TO HENRY HAGENAU, OF NEW YORK, N. Y.

EDUCATIONAL APPLIANCE.

1,343,095.  Specification of Letters Patent.  Patented June 8, 1920.

Application filed April 9, 1920. Serial No. 372,610.

*To all whom it may concern:*

Be it known that I, THEODORE M. SMITH, a citizen of the United States, residing at Bronx, in the county of Bronx and State of New York, have invented new and useful Improvements in Educational Appliances, of which the following is a specification.

This invention relates to games and in particular to those of an educational nature, and its principal object is to provide an interesting means for instructing children in the rudiments of mathematics, spelling, etc., and which could be utilized for playing various games.

Other objects will appear from the following description and claims.

One embodiment of my invention is shown in the accompanying drawing consisting of one sheet, in which:—

Figure 1 is a front elevational view, parts being broken away for clarity and showing the device as adapted for instruction in mathematics.

Fig. 2 is a vertical section of the same.

Fig. 3 is a detail perspective view of one of the plungers.

Fig. 4 is a detail perspective view of one of the master plates or keys, showing the device as adapted for use in teaching spelling.

This device contemplates a providing of a plurality of plungers having normally concealed heads carrying numerals, letters or other characters, and adapted to be operated upon by master plates or keys for causing the plungers to rise in various combinations so as to show the characters thereon for spelling words, giving answers to mathematical problems, etc.

Referring more particularly to the drawings, 1 represents an upright frame member or back which is provided near its top with a cleat 2 provided with a plurality of holes 3 which form bearings for the rods 4 of the plungers. Each plunger comprises in connection with the rod 4 a head 5 upon which is printed, carved or pasted a letter, numeral or other character; and each plunger also includes at its lower end a depending abutment piece 6. Each rod 4 is guided not only by the holes 3 but also by a staple or screweye 7 or other well known guide elements. 8 represents a strip mounted on the outer surface of the cleat 2 and covering the heads of the plungers when the latter are in their depressed position.

9 represents a pair of blocks mounted at opposite sides of the upright 1, and bearing a cross strip 10 to form an aperture or guide way 11 as shown in Fig. 2. Side strips 12 are applied as shown in the figures to finish the appearance of the device. 13 represents one of the plurality of master plates or keys which go with the above described device and each of which is adapted to be moved up into the guide way 11 to effect the raising of the respective combination of said plungers. Each of the master plates is provided with a finger or plurality of fingers 14 for operating one or a number of said plungers and is marked with an arithmetical problem or the picture of some object the name of which is to be spelled.

Let it be supposed that one of the master keys is provided with a legend directing the addition of 8 and 9. This master plate will be provided with two fingers one to cause the raising of the number 1 plunger and the other to cause the raising of the number 7 plunger so that by moving the master plate up into the guide way 11, the plungers 1 and 7 will be raised to display the answer 17.

In like manner if the device is utilized for spelling, the master plate will be provided with an image of an animal or other object—say for instance a cat—, and in this case will be provided with three fingers so that when the master plate is moved up into the guide way 11 it will cause the raising of the three plungers bearing respectively the letters C-A-T.

While I have described what I deem to be the most desirable embodiment of my invention, it is obvious that many of the details may be varied without in any way departing from the spirit of the invention; and I therefore do not wish to be considered as limiting myself to the exact details herein disclosed nor to anything less than the whole of my invention limited only by the appended claims.

Having described my invention what I claim as new and desire to secure by Letters Patent is:—

1. An educational appliance comprising a plurality of plungers having normally concealed heads and provided with abutment pieces, and a plurality of master plates each adapted to effect movement of a different combination of said plungers for exposing their heads.

2. An educational appliance comprising a plurality of plungers each provided with a respective character, and a master plate adapted to operate a plurality of said plungers to form an answer to a question set forth on said master plate.

3. An educational appliance comprising a plurality of plungers each provided with a respective character, and a master plate having a plurality of fingers, each adapted to operate a respective one of said plungers.

4. An educational appliance comprising a plurality of plungers, guiding means therefor, means for concealing one end of said plungers, a plurality of master plates for each selectively operating a respective combination of said plungers to expose the concealed ends thereof, and means common to all of said master plates for guiding the same relatively to said plungers.

In testimony whereof I have affixed my signature.

THEODORE M. SMITH.